(12) United States Patent
Hirano et al.

(10) Patent No.: US 10,417,068 B2
(45) Date of Patent: Sep. 17, 2019

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Tatsuma Hirano, Ota (JP); Takahiro Sekiguchi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 164 days.

(21) Appl. No.: 15/440,166

(22) Filed: Feb. 23, 2017

(65) Prior Publication Data

US 2018/0067792 A1    Mar. 8, 2018

(30) Foreign Application Priority Data

Sep. 5, 2016 (JP) .................................. 2016-173086

(51) Int. Cl.
| | |
|---|---|
| *G06F 11/07* | (2006.01) |
| *G06K 7/10* | (2006.01) |
| *H04W 4/80* | (2018.01) |
| *G06K 7/00* | (2006.01) |

(52) U.S. Cl.
CPC ........ *G06F 11/0727* (2013.01); *G06F 11/076* (2013.01); *G06F 11/0757* (2013.01); *G06K 7/10465* (2013.01); *G06K 7/0008* (2013.01); *H04W 4/80* (2018.02)

(58) Field of Classification Search
CPC . G06F 11/0757; G06F 11/0727; G06F 11/076
See application file for complete search history.

(56) References Cited

U.S. PATENT DOCUMENTS

| | | | | |
|---|---|---|---|---|
| 6,493,772 B1 * | 12/2002 | Hughes | ............... | G06F 11/0727 710/15 |
| 8,467,281 B1 * | 6/2013 | Colon | ................. | G06F 11/0727 369/47.1 |
| 2002/0020744 A1 | 2/2002 | Fukazawa | | |
| 2004/0237006 A1 * | 11/2004 | Adkisson | ............ | G06F 11/0757 714/55 |
| 2007/0213951 A1 * | 9/2007 | Van Eeden | .......... | G06K 7/0008 702/116 |
| 2010/0090807 A1 | 4/2010 | Tsujimoto et al. | | |

(Continued)

FOREIGN PATENT DOCUMENTS

| | | |
|---|---|---|
| EP | 2 254 076 A1 | 11/2010 |
| JP | 3566630 | 9/2004 |

(Continued)

*Primary Examiner* — Yolanda L Wilson
(74) *Attorney, Agent, or Firm* — Oblon, McClelland, Maier & Neustadt, L.L.P.

(57) ABSTRACT

An information processing apparatus includes a receiving unit and a determining unit. The receiving unit receives read information that is read by a reading unit from a storage medium a plurality of number of times. The determining unit determines abnormality in a reading process performed by the reading unit, based on a first result acquired by comparing a time interval of reading the read information with a first threshold, or on a second result acquired by comparing the number of times the reading is performed with a second threshold.

5 Claims, 6 Drawing Sheets

(56) References Cited

U.S. PATENT DOCUMENTS

| | | | |
|---|---|---|---|
| 2012/0198152 A1* | 8/2012 | Terry | G06F 11/2094 |
| | | | 711/114 |
| 2013/0024734 A1* | 1/2013 | Katsuragi | G06F 3/0611 |
| | | | 714/55 |
| 2015/0106664 A1* | 4/2015 | McClain | G06F 11/0769 |
| | | | 714/57 |
| 2016/0292025 A1* | 10/2016 | Gupta | G06F 11/076 |

FOREIGN PATENT DOCUMENTS

| JP | 2012-103877 | 5/2012 |
|---|---|---|
| JP | 5031293 | 9/2012 |

* cited by examiner

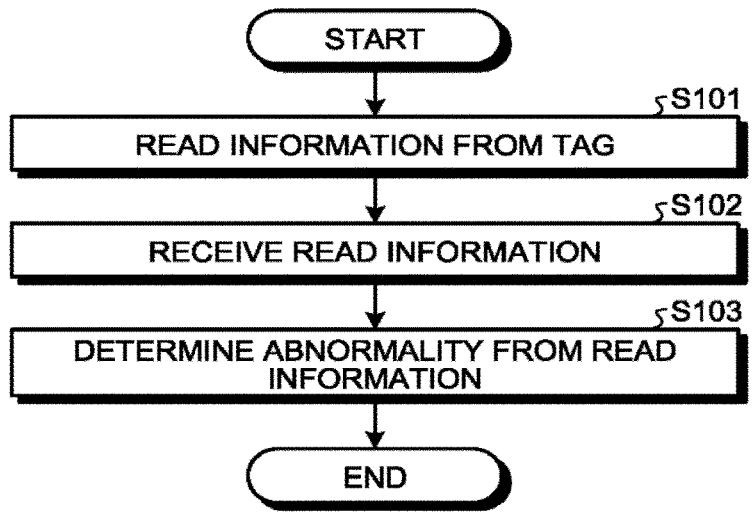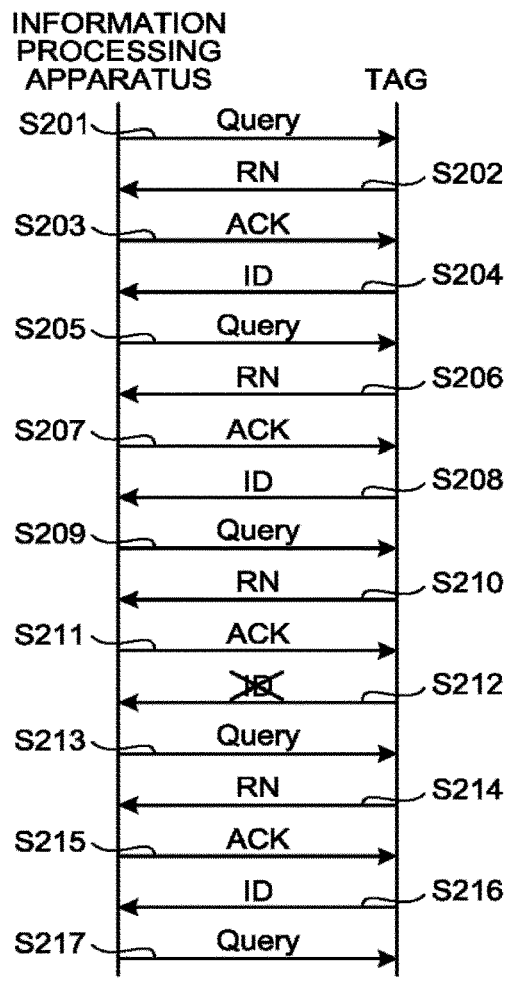

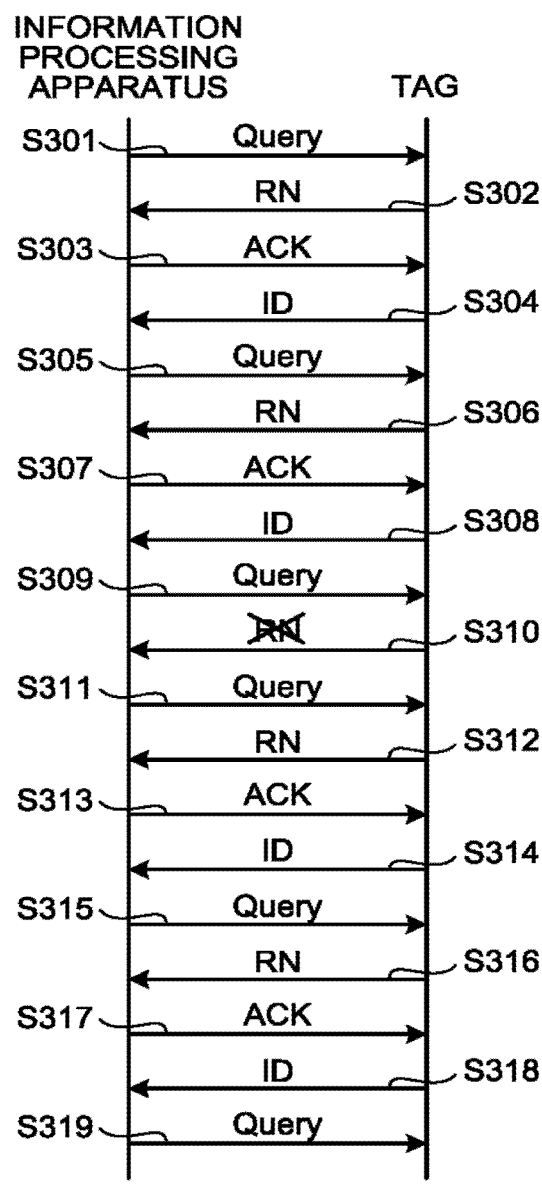

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2016-173086, filed on Sep. 5, 2016; the entire contents of which are incorporated herein by reference.

FIELD

Embodiments described herein relate generally to an information processing apparatus, an information processing method, and a computer program product.

BACKGROUND

Technologies for reading information from a storage medium such as a radio frequency identifier (RFID) tag have been known. Also known as methods for accommodating with any abnormality in reading such a tag are those for reducing reading errors by making an appropriate antenna selection or by controlling power, or for detecting and correcting errors by appending parity or using some error correction code.

However, with such conventional technologies, processing load is increased due to the processes such as the antenna selection or the power control, disadvantageously.

BRIEF DESCRIPTION OF THE DRAWINGS

FIG. 3 is a flowchart of a determining process in the first embodiment;

FIG. 4 is a sequence chart of a process by which information is read from the same tag;

FIG. 5 is another sequence chart of the process by which information is read from the same tag;

DETAILED DESCRIPTION

According to one embodiment, an information processing apparatus includes a receiving unit and a determining unit. The receiving unit receives read information that is read by a reading unit from a storage medium a plurality of number of times. The determining unit determines abnormality in a reading process performed by the reading unit, based on a first result acquired by comparing a time interval of reading the read information with a first threshold, or on a second result acquired by comparing the number of times the reading is performed with a second threshold.

An exemplary embodiment of an information processing apparatus according to the present invention will now be explained in detail, with reference to the appended drawings.

First Embodiment

An information processing apparatus according to a first embodiment receives a plurality of pieces of read information acquired by reading the information from a storage medium (tag) such as an RFID tag a plurality of number of times, and determines abnormalities in the reading process based on the time interval of reading the pieces of information (reading interval). In this manner, abnormalities in reading a tag can be detected in a more simplified manner.

Figure 1:
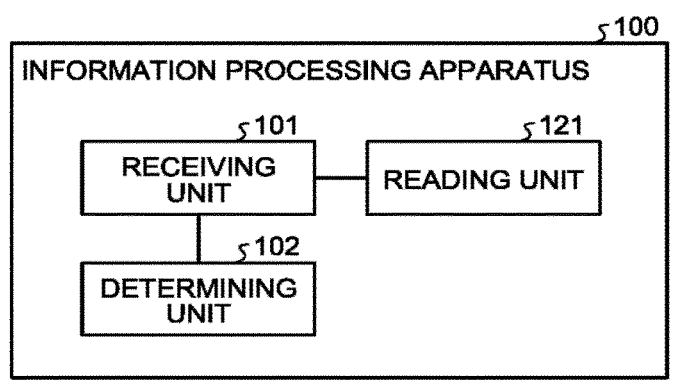
FIG. 1 is a block diagram of an information processing apparatus according to a first embodiment.

FIG. 1 is a block diagram illustrating an exemplary configuration of such an information processing apparatus 100 according to the first embodiment. As illustrated in FIG. 1, the information processing apparatus 100 includes a reading unit 121, a receiving unit 101, and a determining unit 102.

The reading unit 121 reads information from a storage medium storing therein the information. For example, the reading unit 121 reads information from the storage medium contactlessly via near field communication. The contactless communication protocol may be any protocol having been conventionally used, such as RFID. For example, the reading unit 121 reads information from the tag based on a protocol that is based on EPC global Class 1 Generation 2. When RFID is used, a tag (also referred to as an RF tag or an IC tag, for example) for retaining and storing therein information is used as the storage media.

The reading unit 121 is configured to read the information from the same tag a plurality of number of times. For example, during the time for which the reading unit 121 is within a readable range of the tag, the reading unit 121 reads the information from the tag a plurality of number of times, and outputs the read information. The readable range is a range in which the information can be read contactlessly via the near field communication, for example.

The reading unit 121 may move relatively to the tag. For example, the reading unit 121 may be provided to a moving body such as a vehicle, and read information from a tag installed along the moving path of the moving body a plurality of number of times. The thus read information may be used in detecting the position of the moving body, in the manner to be described later. Alternatively, the tag may move, instead of causing the reading unit 121 to move, or both of the tag and the reading unit 121 may move. When the reading unit 121 and the tag move relatively to each other, the range in which the reading unit 121 is capable of reading information from the tag along the moving path may be established as the readable range of the tag.

The receiving unit 101 receives the information read by the reading unit 121 (read information). For example, the receiving unit 101 receives a plurality of pieces of read information acquired as a result of the process of the reading unit 121 reading information from the tag (reading process) a plurality of number of times.

The reading unit 121 passes the pieces of read information to the receiving unit 101 all at once, for example. In such a case, the reading unit 121 passes the read information including information for identifying the timing at which each of such pieces of information is read (such as the date and the time) to the receiving unit 101. The reading unit 121 may also pass the read information to the receiving unit 101 every time the reading unit 121 reads the information from the tag. In such a case, the read information does not need to include the information for identifying the timing at which such a piece of information is read. This is because the receiving unit 101 can determine the timing at which the read information is received as the timing at which the information is read.

The determining unit 102 refers to the received read information, and determines abnormalities in the reading process. In this embodiment, the determining unit 102 uses the time interval of reading the information as the determination information, compares the determination information with a threshold, and determines some abnormalities in the reading process based on the comparison result. For example, if the read time interval is equal to or longer than the threshold, the determining unit 102 determines that there is some abnormality in the reading process.

The receiving unit 101 and the determining unit 102 may be implemented by causing one or more processors such as a central processing unit (CPU) to execute a computer program, that is, implemented as software, as hardware such as one or more integrated circuits (IC), or may be implemented as a combination of software and hardware.

Figure 2:
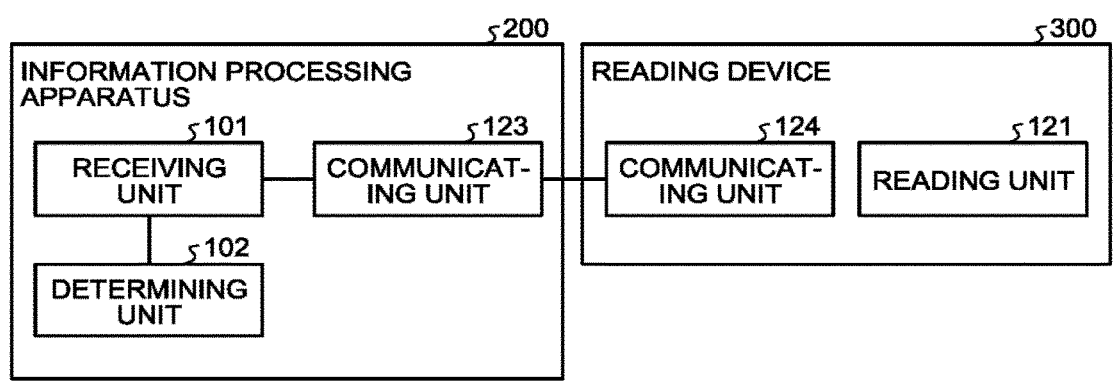
FIG. 2 is a block diagram of an information processing system according to a modification.

Illustrated in FIG. 1 is an exemplary configuration in which the information processing apparatus 100 includes the reading unit 121. The reading unit 121 may be, however, provided external to the information processing apparatus. FIG. 2 is a block diagram illustrating an exemplary configuration of an information processing system, configured in such a manner, according to a modification of the first embodiment.

The information processing system illustrated in FIG. 2 includes an information processing apparatus 200 and a reading device 300. The information processing apparatus 200 is connected with the reading device 300 over some form of connection such as a network, including the Internet, or a connection cable.

The information processing apparatus 200 includes the receiving unit 101, the determining unit 102, and a communicating unit 123. The reading device 300 includes a communicating unit 124 and the reading unit 121. Elements that are the same as those illustrated in FIG. 1 are given the same reference numerals, and explanations thereof are omitted herein.

The communicating unit 123 communicates with external devices such as the reading device 300. The communicating unit 124 communicates with external devices such as the information processing apparatus 200. For example, the communicating unit 123 and the communicating unit 124 transmit and receive information, such as the read information, in accordance with predetermined protocols such as Transmission Control Protocol/Internet Protocol (TCP/IP). The communication between the communicating unit 123 and the communicating unit 124 may be established over the wire or wirelessly.

The reading device 300 is provided to a moving body such as a vehicle. The information processing apparatus 200 is a server device, for example, capable of communicating with the reading device 300 via some wireless communication. The information processing apparatus 200 can determine abnormalities in the reading process by receiving the read information from the reading device 300.

A determining process performed by the information processing apparatus 100 according to the first embodiment configured in the manner described above will now be explained with reference to FIG. 3. FIG. 3 is a flowchart illustrating an example of the determining process in the first embodiment.

The reading unit 121 reads information from the tag (Step S101). As mentioned earlier, the reading unit 121 reads the information from the same tag a plurality of number of times. The reading unit 121 outputs the read information every time the information is read, or outputs a plurality of pieces of read information all at once, after reading the pieces of information.

The receiving unit 101 receives the read information read by the reading unit 121 (Step S102). In a configuration such as that illustrated in FIG. 2, the receiving unit 101 may receive the read information received by the communicating unit 123.

The determining unit 102 refers to the received read information, and determines abnormalities in the reading process (Step S103). For example, the reading interval of the pieces of read information is equal to or longer than a predetermined threshold, the determining unit 102 determines that there is some abnormality in the reading process.

A specific example of the process by which information is read from the same tag will now be explained. FIG. 4 is a sequence chart illustrating an example of the process by which information is read from the same tag. Illustrated in FIG. 4 is an example in which the information is read from the tag by causing the information processing apparatus 100 (the reading unit 121) to transmit a predetermined instruction (a "Query" in FIG. 4) every time the information is to be read. FIG. 4 illustrates an example of a failure occurs in reading one type of information that should be returned from the tag (an "ID" in FIG. 4).

To begin with, the reading unit 121 in the information processing apparatus 100 transmits a "Query" that is an instruction for searching for a tag (Step S201). If there is no response from any tag within a predetermined time, the reading unit 121 transmits the "Query" again.

The tag having received the "Query" transmits a "random number (RN)" representing a random sequence to the reading unit 121 within a predetermined time (Step S202).

The reading unit 121 having received the "RN" transmits an "ACK" representing a response to the tag within a predetermined time (Step S203).

The tag having received the "ACK" transmits the "ID" which is a piece of information stored in the tag to the reading unit 121 within a predetermined time (Step S204). The "ID" is identification information for identifying the tag (tag ID), for example. The tag may also be configured to return some information other than the identification information.

The reading unit 121 having received the "ID" notifies the receiving unit 101 of the "ID" and the timing at which the tag is read, and transmits the "Query" for searching for the tag so as to read the tag again (Step S205).

The timing at which the tag is read may be information in any format enabling such timing at which the tag is read to be identified. The reading unit 121 may receive the information indicating the timing at which the tag is read, as well as the "ID", from the tag, and transmit the information and the "ID" to the receiving unit 101. The reading unit 121 may also determine the timing at which the tag is read based on a timer, for example, and transmit the determined timing at which the tag is read to the receiving unit 101. As mentioned earlier, the receiving unit 101 (or the determining unit 102) may determine the timing at which the "ID" is received as the timing at which the tag is read, without causing the reading unit 121 to transmit the timing at which the tag is read.

The tag having received the "Query" transmits an "RN" to the reading unit 121 within a predetermined time (Step S206).

The reading unit 121 having received the "RN" transmits an "ACK" to the tag within a predetermined time (Step S207).

The tag having received the "ACK" transmits the "ID" to the reading unit 121 within a predetermined time (Step S208).

The reading unit 121 having received the "ID" notifies the receiving unit 101 of the "ID" and the timing at which the tag is read, and transmits the "Query" for searching for the tag so as to read the tag again (Step S209).

The tag having received the "Query" transmits an "RN" to the reading unit 121 within a predetermined time (Step S210).

The reading unit 121 having received the "RN" transmits an "ACK" to the tag within a predetermined time (Step S211).

The tag having received the "ACK" transmits the "ID" to the reading unit 121 within a predetermined time (Step S212).

In this example, it is assumed that the reading unit 121 has failed to receive an "ID" for some reason. The reading unit 121 having failed to receive the "ID" transmits the "Query" for searching for the tag so as to read the tag again (Step S213).

The tag having received the "Query" transmits an "RN" to the reading unit 121 within a predetermined time (Step S214).

The reading unit 121 having received the "RN" transmits an "ACK" to the tag within a predetermined time (Step S215).

The tag having received the "ACK" transmits the "ID" to the reading unit 121 within a predetermined time (Step S216).

The reading unit 121 having received the "ID" notifies the receiving unit 101 of the "ID" and the timing at which the tag is read, and transmits the "Query" for searching for the tag so as to read the tag again (Step S217).

It is assumed now that the tag then moves out of the readable range. The reading unit 121 determines the tag has moved out of the readable range based on the fact that there is no response even though the "Query" has been transmitted again for a predetermined number of times, for example. This ends the interaction between the reading unit 121 and the tag.

In the example illustrated in FIG. 4, every time the "ID" is read, the reading unit 121 outputs the read "ID" to the receiving unit 101, but the reading unit 121 may output the read "IDs" and the timing at which the respective "IDs" are read to the receiving unit 101 all at once, at the timing at which the tag has moved out of the readable range, for example.

As illustrated in FIG. 4, the time interval between Step S204 and Step S208 with no abnormality in reading "IDs" is within a predetermined threshold. By contrast, when any abnormality occurs in reading the "ID" as in the scenario at Step S212, the time at which the "ID" is read subsequent to Step S208 will be at Step S216. Thus, the reading interval of the "ID" becomes longer than the threshold. Hence, the determining unit 102 can determine whether any abnormality has occurred during the reading, based on whether the reading interval of the "ID" is within the threshold.

Another specific example of the process by which information is read from the same tag will now be explained.

FIG. 5 is a sequence chart illustrating another example of the process by which information is read from the same tag. FIG. 5 represents an example in which the information is read from the tag in response to a "Query" transmitted from the information processing apparatus 100 (the reading unit 121) every time the information is to be read. Also illustrated in FIG. 5 is an example in which a failure occurs in reading an "RN" that is one type of information that should be returned from the tag.

To begin with, the reading unit 121 in the information processing apparatus 100 transmits the "Query" for searching for the tag (Step S301). If there is no response from any tag within a predetermined time, the reading unit 121 transmits the "Query" again.

The tag having received the "Query" then transmits an "RN" to the reading unit 121 within a predetermined time (Step S302).

The reading unit 121 having received the "RN" then transmits the "ACK" to the tag within a predetermined time (Step S303).

The tag having received the "ACK" then transmits the "ID" to the reading unit 121 within a predetermined time (Step S304).

The reading unit 121 having received the "ID" then notifies the receiving unit 101 of the "ID" and the timing at which the tag is read, and transmits the "Query" for searching for the tag so as to read the tag again (Step S305).

The tag having received the "Query" then transmits the "RN" to the reading unit 121 within a predetermined time (Step S306).

The reading unit 121 having received the "RN" then transmits the "ACK" to the tag within a predetermined time (Step S307).

The tag having received the "ACK" then transmits the "ID" to the reading unit 121 within a predetermined time (Step S308).

The reading unit 121 having received the "ID" then notifies the receiving unit 101 of the "ID" and the timing at which the tag is read, and transmits the "Query" for searching for the tag so as to read the tag again (Step S309).

The tag having received the "Query" then transmits the "RN" to the reading unit 121 within a predetermined time (Step S310).

In this example, it is assumed that the reading unit 121 has failed to receive the "RN" for some reason. The reading unit 121 having failed to receive the "RN" then transmits the "Query" to the tag again (Step S311).

The tag having received the "Query" then transmits an "RN" to the reading unit 121 within a predetermined time (Step S312).

The reading unit 121 having received the "RN" then transmits the "ACK" to the tag within a predetermined time (Step S313).

The tag having received the "ACK" then transmits the "ID" to the reading unit 121 within a predetermined time (Step S314).

The reading unit 121 having received the "ID" then notifies the receiving unit 101 of the "ID" and the timing at which the tag is read, and transmits the "Query" for searching for the tag so as to read the tag again (Step S315).

The tag having received the "Query" then transmits an "RN" to the reading unit 121 within a predetermined time (Step S316).

The reading unit 121 having received the "RN" then transmits the "ACK" to the tag within a predetermined time (Step S317).

The tag having received the "ACK" then transmits the "ID" to the reading unit 121 within a predetermined time (Step S318).

The reading unit 121 having received the "ID" then notifies the receiving unit 101 of the "ID" and the timing at which the tag is read, and transmits the "Query" for searching for the tag so as to read the tag again (Step S319).

If the tag moves out of the readable range, the interaction between the reading unit 121 and the tag is ended.

As illustrated in FIG. 5, the time interval between Step S304 and Step S308 with no abnormality in the process of reading the "ID" is within the predetermined threshold. By contrast, when some abnormality occurs in reading an "RN" before the "ID" is read, as at Step S310, the timing at which the "ID" is read subsequent to Step S308 will be at Step S313. Thus, the reading interval of the "ID" exceeds the threshold. Hence, the determining unit 102 can determine whether any abnormality has occurred in the reading, based on whether the reading interval of the "ID" is within the threshold.

In the manner described above, in the example illustrated in FIG. 5, another type of abnormality that is different from the example illustrated in FIG. 4, which is an abnormality in reading the "RN", can be detected.

Figure 6:
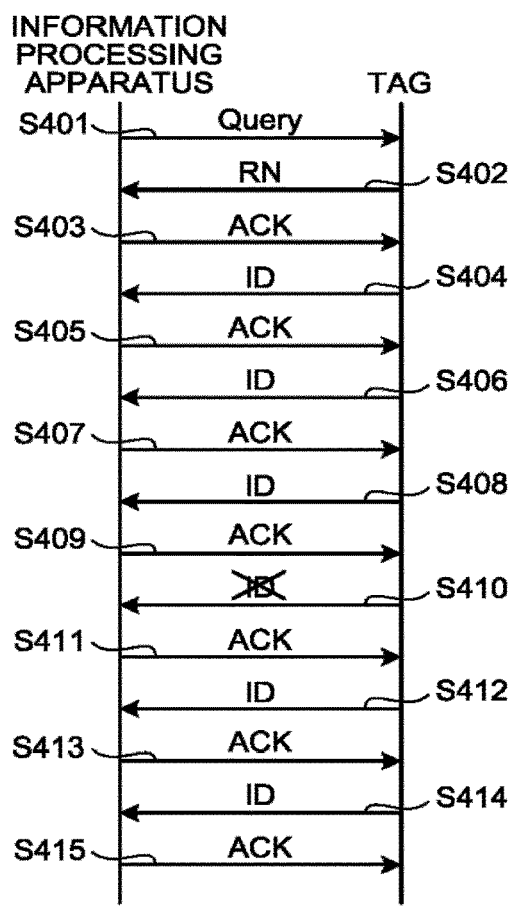
FIG. 6 is another sequence chart of the process by which information is read from the same tag.

Still another specific example of process of reading the information from the same tag will now be explained. FIG. 6 is a sequence chart illustrating another example of the process by which information is read from the same tag. FIG. 6 represents an example in which the information processing apparatus 100 (the reading unit 121) reads a plurality of pieces of the information from the tag, by transmitting a "Query" once at the beginning. FIG. 6 also illustrates an example in which the information processing apparatus 100 fails to read the "ID" that is one type of information that should be returned from the tag.

To begin with, the reading unit 121 transmits the "Query" for searching for the tag (Step S401).

The tag having received the "Query" transmits an "RN" to the reading unit 121 within a predetermined time (Step S402).

The reading unit 121 having received the "RN" transmits the "ACK" to the tag within a predetermined time (Step S403).

The tag having received the "ACK" transmits the "ID" to the reading unit 121 within a predetermined time (Step S404).

The reading unit 121 having received the "ID" transmits the "ACK" to the tag within a predetermined time so as to read the "ID" again (Step S405).

The tag having received the "ACK" transmits the "ID" to the reading unit 121 within a predetermined time (Step S406).

The reading unit 121 having received the "ID" transmits the "ACK" to the tag within a predetermined time so as to read the "ID" again (Step S407).

The tag having received the "ACK" transmits the "ID" to the reading unit 121 within a predetermined time (Step S408).

The reading unit 121 having received the "ID" transmits the "ACK" to the tag within a predetermined time so as to read the "ID" again (Step S409).

The tag having received the "ACK" transmits the "ID" to the reading unit 121 within a predetermined time (Step S410).

In this example, it is assumed that the reading unit 121 has failed to receive the "ID" for some reason. To read the "ID" again, the reading unit 121 having failed to receive the "ID" transmits the "ACK" to the tag within a predetermined time (Step S411).

The tag having received the "ACK" transmits the "ID" to the reading unit 121 within a predetermined time (Step S412).

The reading unit 121 having received the "ID" transmits the "ACK" to the tag within a predetermined time so as to read the "ID" again (Step S413).

The tag having received the "ACK" transmits the "ID" to the reading unit 121 within a predetermined time (Step S414).

The reading unit 121 having received the "ID" transmits the "ACK" to the tag within a predetermined time so as to read the "ID" again (Step S415).

If the tag moves out of the readable range at this point in time, the interaction between the reading unit 121 and the tag is ended.

As illustrated in FIG. 6, while there is no abnormality in reading the "ID", each of the time intervals between Step S404 and Step S406, and Step S406 and Step S408, for example, is within the predetermined threshold. By contrast, when some abnormality occurs in reading the "ID" as in the scenario at Step S410, because the time at which the "ID" is read subsequent to Step S408 will be at Step S412, the reading interval of the "ID" exceeds the threshold. Hence, the determining unit 102 can determine whether any reading abnormality has occurred based on whether the reading interval of the "ID" is within the threshold.

In the manner described above, in the information processing apparatus according to the first embodiment, any abnormality in reading the tag can be detected based on the reading interval of the information stored in the tag. As a result, for example, it is possible to identify a range in which the information can be read correctly from the tag. Furthermore, because processes such as the antenna selection, the power control, and the error correction using an error correction code are not necessary, abnormalities can be determined in a more simplified manner.

Second Embodiment

When a speed at which the tag and the reading device (reading unit) move relative to each other is known, for example, it is possible to predict how many times the reading device (reading unit) can read the information from the tag from when the reading device (reading unit) enters the readable range of the tag to when the reading device (reading unit) exits the readable range, as the tag and the reading device (reading unit) move. Reading abnormalities can then be determined by comparing the prediction with the actual number of times the information is read.

The information processing apparatus according to a second embodiment determines abnormalities in the reading process based on the number of pieces of read information read from the same tag, that is, based on the number of times the same information is read from the tag (read count).

In the first embodiment, there is a possibility that some abnormality cannot detected based on the reading interval of the information, if the abnormality occurs in the first or the last reading, for example. With the method according to the second embodiment, however, the abnormality in reading the information can be detected even when the abnormality occurs in the first or the last reading.

Figure 7:
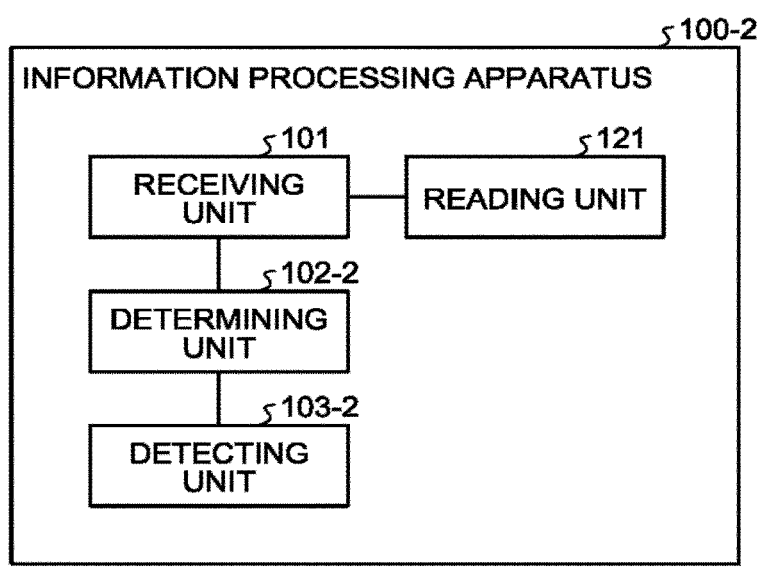
FIG. 7 is a block diagram of an information processing apparatus according to a second embodiment.

FIG. 7 is a block diagram illustrating an exemplary configuration of an information processing apparatus 100-2 according to the second embodiment. As illustrated in FIG. 7, the information processing apparatus 100-2 includes the reading unit 121, the receiving unit 101, a determining unit 102-2, and a detecting unit 103-2.

The second embodiment is different from the first embodiment in having an additional function in the determining unit 102-2, and the detecting unit 103-2. Because the other elements and the functions are the same as those illustrated in FIG. 1, which is a block diagram of the information processing apparatus 100 according to the first embodiment, the same reference numerals are assigned to such elements and functions, and explanations thereof will be omitted herein.

The detecting unit 103-2 detects the speed of the relative movement of the tag with respect to the reading unit 121. The detecting unit 103-2 can detect the moving speed using various methods such as a method for acquiring the moving speed from the speed meter of the moving body where the reading unit 121 is mounted onboard, a method for detecting the speed based on the reading interval of a plurality of tags, and a method for detecting the speed based on some information received from an accelerometer.

The determining unit 102-2 calculates a prediction of the number of pieces of information to be read (read count forecast), based on the detected moving speed and the readable range of the tag. The prediction is then used as a threshold to be compared with the determination information. The determining unit 102-2 then uses the number of pieces of read information having been read (the read count) as the determination information, compares the determination information with the threshold, and determines abnormalities in the reading process based on the comparison result. For example, the determining unit 102-2 determines that there is some abnormality in the reading process when the read count is less than the threshold.

Figure 8:
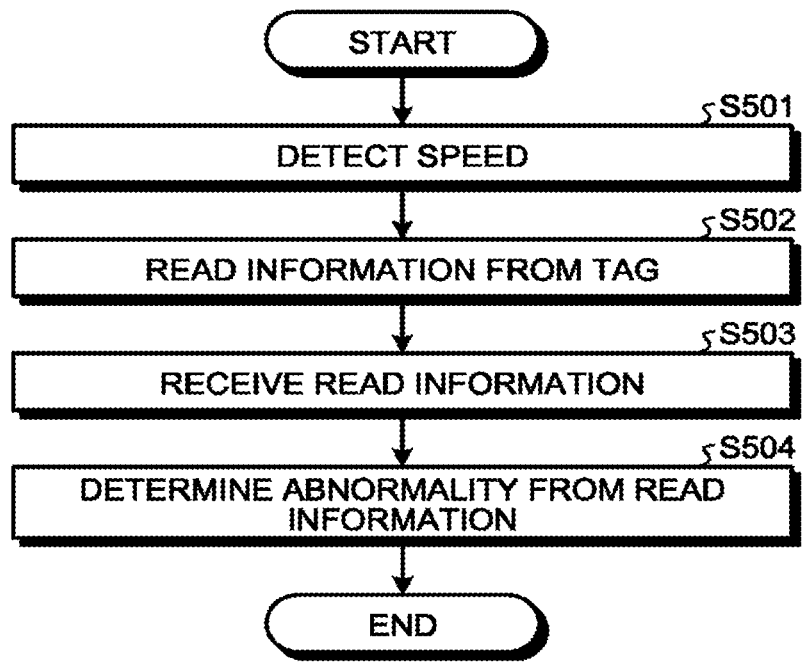
FIG. 8 is a flowchart of a determining process in the second embodiment.

A determining process performed by the information processing apparatus 100-2 according to the second embodiment configured in the manner described above will now be explained with reference to FIG. 8. FIG. 8 is a flowchart illustrating an example of the determining process in the second embodiment.

The detecting unit 103-2 detects the speed at which the tag moves relatively to the reading unit 121 (Step S501).

The reading unit 121 then reads the information from the tag (Step S502). The reading unit 121 reads the information from the same tag a plurality of number of times. The receiving unit 101 then receives the read information read by the reading unit 121 (Step S503).

The determining unit 102-2 then refers to the received read information, and determines abnormalities in the reading process (Step S504). For example, the determining unit 102-2 calculates a read count forecast based on the moving speed detected at Step S501 and the readable range of the tag. The determining unit 102-2 determines that there is some abnormality in the reading process if the count at which the read information is read is less than the read count forecast.

In this embodiment, because the sequence of the process by which information is read from the same tag is the same as that according to the first embodiment illustrated in FIGS. 4 to 6, explanations thereof are omitted herein.

A specific example of the determining process performed by the determining unit 102-2 will now be explained. The determining unit 102-2 calculates the number of times the information is read from the tag while passing through the readable range of the same tag once, based on the speed detected by the detecting unit 103-2, the readable range of the tag, and the time required for the information (such as the tag ID) to be read once.

To begin with, every time the tag is passed once, the determining unit 102-2 calculates the time for which the information processing apparatus 100-2 is within the readable range, based on (readable range)/(speed). For example, assuming that the moving speed is 72 [km/h] (20 [m/s]), and the readable range of the tag is 0.8 [m], the time for which the information processing apparatus 100-2 is within the readable range while passing through the tag once is 0.8 [m]/20 [m/s]=40 [ms].

The determining unit 102-2 then calculates the number of times the information is to be read while passing through the readable range of the same tag once (read count forecast), based on (time for which the information processing apparatus is within the readable range)/(time required for information to be read once). For example, assuming that the time required for the information to be read once is 10 [ms], the number of times the information is to be read while the information processing apparatus 100-2 passes through the tag once will be 40 [ms]/10 [ms]=four times.

Let us now assume that the read count forecast is four, and the information is read in the manner illustrated in the example of FIG. 4. In the example illustrated in FIG. 4, the number of times the reading of the information has succeeded was three. Because the number of times the reading of the information has succeeded was less than the read count forecast, the determining unit 102-2 determines that some reading abnormality has occurred.

In the manner described above, the information processing apparatus according to the second embodiment can detect abnormalities in reading the tag based on a forecast of the count by which the information is read from the tag.

Example of Position Determining Method

The position of the moving body can be determined by recognizing the timing at which the information (such as the tag ID) is read from the same tag, appropriately. For example, the moving body (information processing apparatus) retains a database of position information corresponding to the tag ID. Upon receiving the tag ID, the information processing apparatus issues a query to the position information database, and determines the position of the moving body.

To determine the position of the moving body, the information processing apparatus needs to determine, for the tag ID having been read a plurality of number of times, at which timing the information processing apparatus has passed the position nearest to the tag (e.g., immediately above the tag). When there has been no abnormality in reading the tag ID, or no reading has been skipped, the information processing apparatus may take the average of the time at which the tag ID was read a plurality of respective times, and consider the average as the time at which the information processing apparatus has passed the position immediately above the tag.

When there has been some abnormality in reading the tag ID, or some reading has been skipped, various possible methods are available as a way to handle the portion in which the information processing apparatus has failed to read the tag ID. For example, assuming that the tag ID has been read six times, and that the second reading of the tag ID has failed, the average mentioned above may be calculated using the first, the third, the fourth, and the sixth reading of the tag ID, by excluding the fifth reading of the tag ID that corresponds to the second reading of the tag ID. It is also possible to calculate the time at which the tag ID should have been read the second time using the time at which the tag ID was read the first time and the third time, and to calculate the average using the entire time at which the tag ID was read the six times.

Any other known averaging approach may be used in determining the position of the tag, without imitation to the averaging approaches described above.

Positions where Antenna and Tag are Installed

Another example of the moving body having a position to be detected is a train. For example, a position of a train can be detected by installing an RFID antenna on the vehicle, and installing an RFID tag on the ground.

Figure 9:
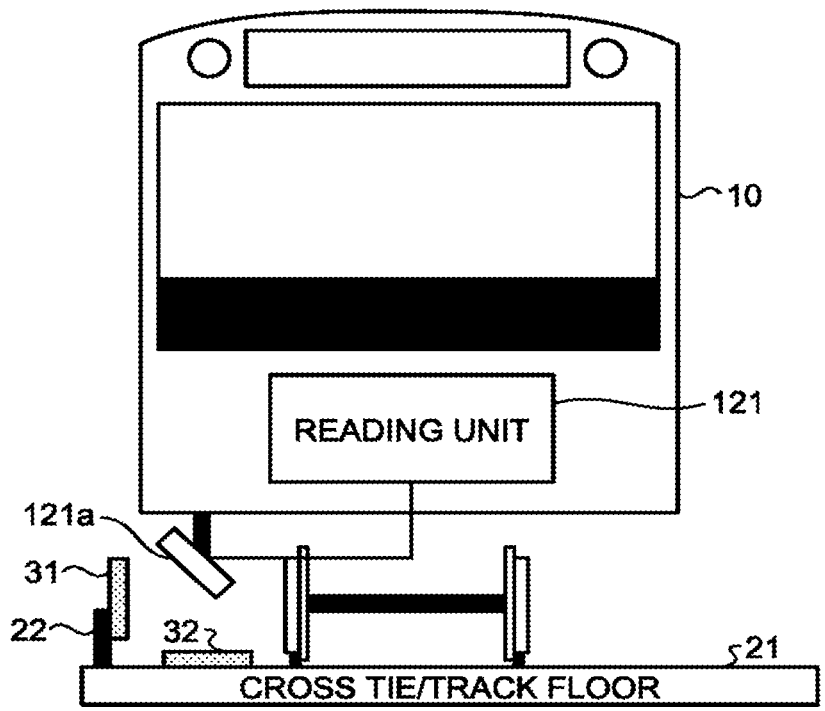
FIG. 9 is a diagram illustrating an example of the positions at which an antenna and a tag are installed.
Figure 10:
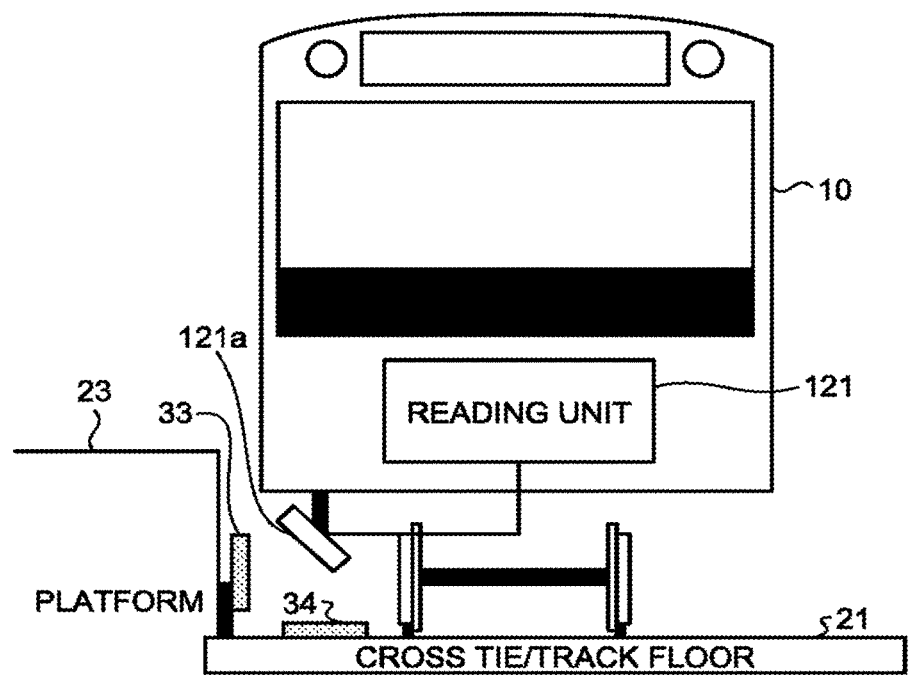
FIG. 10 is a diagram illustrating another example of the positions at which the antenna and the tag are installed.

FIGS. 9 and 10 are diagrams illustrating examples of the positions at which the antenna and the tag are installed. As illustrated in FIGS. 9 and 10, a vehicle 10 includes the reading unit 121 and an antenna 121a. The vehicle 10 may also include any other elements of the information processing apparatus 100 illustrated in FIG. 1 (the receiving unit 101, the determining unit 102), or any other elements of the reading device 300 illustrated in FIG. 2 (the communicating unit 124).

In FIGS. 9 and 10, the antenna 121a is installed on the read side of the floor of the vehicle 10. The position at which the antenna 121a is installed on the vehicle 10 is not limited thereto, and may be, for example, on the ladder near a crew's room, or on a window of the train.

Illustrated in FIG. 9 is an example in which a tag 31 is installed on a pole 22 provided upright beside the railroad track, and a tag 32 is installed on a cross tie or a track floor 21. Illustrated in FIG. 10 is an example in which a tag 33 is installed on a platform 23, and a tag 34 is installed on the cross tie or the track floor 21. The positions at which the tags 31 to 34 are installed are not limited to these examples.

As described above, according to the first and the second embodiments, abnormalities in reading a tag can be detected in a more simplified manner.

Figure 11:
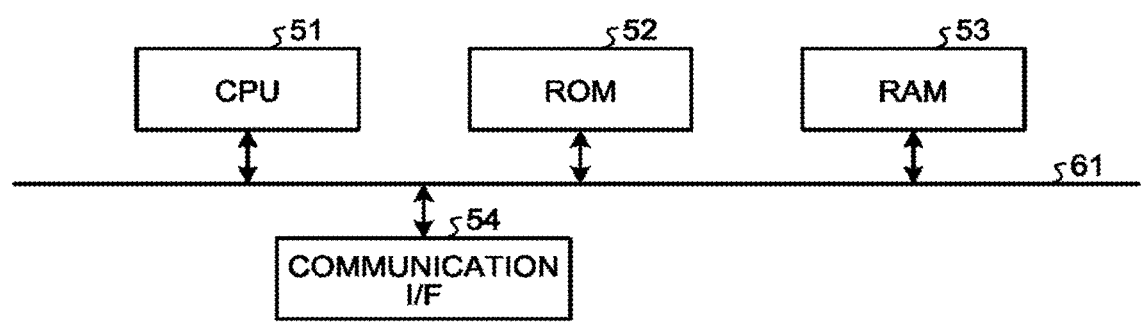
FIG. 11 is a hardware configuration diagram of the information processing apparatus according to the embodiments.

A hardware configuration of the information processing apparatus according to the first or the second embodiment will now be explained with reference to FIG. 11. FIG. 11 is a diagram for explaining an exemplary hardware configuration of the information processing apparatus according to the first or the second embodiment.

The information processing apparatus according to the first or the second embodiment includes a controller such as a central processing unit (CPU) 51, a storage device such as a read-only memory (ROM) 52 and a random access memory (RAM) 53, a communication interface (I/F) 54 connecting to and communicating via a network, and a bus 61 connecting these devices.

A computer program executed in the information processing apparatus according to the first or the second embodiment is provided incorporated in the ROM 52 or the like in advance.

The computer program executed in the information processing apparatus according to the first or the second embodiment may be provided as a computer program product provided stored in a computer-readable recording medium such as a compact disc read-only memory (CD-ROM), a flexible disk (FD), a compact disc recordable (CD-R), or a digital versatile disc (DVD), as file in an installable or executable format.

Furthermore, the computer program executed in the information processing apparatus according to the first or the second embodiment may be stored in a computer connected to a network such as the Internet, and made available for download over the network. Furthermore, the computer program executed in the information processing apparatus according to the first or the second embodiment may also be provided or distributed over a network such as the Internet.

The computer program executed in the information processing apparatus according to the first or the second embodiment can cause a computer to function as the units included in the information processing apparatus described above. Such a computer can cause the CPU 51 to read the computer program from a computer-readable storage medium onto the main memory, and to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a receiving unit configured to receive read information that is read by a reading unit from a storage medium a plurality of number of times;
   a determining unit configured to determine that there is abnormality in a reading process performed by the reading unit when the number of times the reading is performed is less than a threshold, and
   a detecting unit configured to detect a moving speed of the storage medium moving relatively to the reading unit, wherein
   the determining unit is configured to calculate a prediction of the number of times information to be read is read as the threshold, based on the moving speed, and on a readable range of the storage medium.

2. The information processing apparatus according to claim 1, further comprising the reading unit.

3. The information processing apparatus according to claim 2, wherein the information processing apparatus is provided to a moving body configured to move relatively to the storage medium.

4. An information processing method comprising:
   receiving read information that is read by a reading unit from a storage medium a plurality of number of times;
   detecting a moving speed of the storage medium moving relatively to the reading unit; and
   calculating a prediction of the number of times information to be read is read as a threshold, based on the moving speed, and on a readable range of the storage medium; and
   determining that there is abnormality in a reading process performed by the reading unit when the number of times the reading is performed is less than the threshold.

5. A computer program product having a non-transitory computer readable medium including programmed instructions, wherein the instructions, when executed by a computer, cause the computer to perform:
   receiving read information that is read by a reading unit from a storage medium a plurality of number of times;
   detecting a moving speed of the storage medium moving relatively to the reading unit;

calculating a prediction of the number of times information to be read is read as a threshold, based on the moving speed, and on a readable range of the storage medium; and determining that there is abnormality in a reading process performed by the reading unit when the number of times the reading is performed is less than the threshold.

\* \* \* \* \*